(12) United States Patent
Carbone et al.

(10) Patent No.: US 9,444,558 B1
(45) Date of Patent: Sep. 13, 2016

(54) SYNTHETIC ROBUST ADAPTIVE BEAMFORMING

(71) Applicants: Christopher P Carbone, Cranston, RI (US); Steven M Kay, Middletown, RI (US)

(72) Inventors: Christopher P Carbone, Cranston, RI (US); Steven M Kay, Middletown, RI (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 0 days.

(21) Appl. No.: 15/010,110

(22) Filed: Jan. 29, 2016

(51) Int. Cl.
*H03D 1/04* (2006.01)
*H04B 15/00* (2006.01)
*H04W 24/08* (2009.01)
*H04W 84/18* (2009.01)

(52) U.S. Cl.
CPC ............. *H04B 15/00* (2013.01); *H04W 24/08* (2013.01); *H04W 84/18* (2013.01)

(58) Field of Classification Search
CPC ... H04L 27/2647; H04L 1/20; H04L 1/0003; H04L 1/0071; H04L 5/0007; H04L 1/0009; H04L 27/0008; H04B 1/1027; H04B 1/123; H04B 1/1036; H04B 1/30; H04B 1/28; H04B 1/40; H04B 3/23; H04N 5/4401
USPC .................................. 375/346, 316, 219, 295
See application file for complete search history.

(56) References Cited

U.S. PATENT DOCUMENTS

2012/0114072 A1* 5/2012 Liu ...................... H04B 7/0639
375/296

* cited by examiner

*Primary Examiner* — Zewdu Kassa
(74) *Attorney, Agent, or Firm* — James M. Kasichke; Michael P. Stanley

(57) ABSTRACT

A method for beamforming digitized signals from a sensor array to enhance signals originating from a preselected angle of interest and a preselected range bin while suppressing interference signals from other angles of arrival. Snapshots of sensor data are acquired and used to estimate an autocorrelation function. An autoregressive model of power is determined over angles of arrival as polynomial coefficients and roots are calculated as associated with the interference signals. Roots are selected for suppression by providing nulls. Exponentials are constructed from the roots. The exponentials are used with variances from the autoregressive model to provide a synthetic covariance matrix having weights that suppress the interference signals.

14 Claims, 2 Drawing Sheets

SYNTHETIC ROBUST ADAPTIVE BEAMFORMING

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates to performing adaptive beamforming and, more particularly, to performing adaptive beamforming using a synthetic covariance matrix.

(2) Description of the Prior Art

Beamforming or spatial filtering is a signal processing technique used for directional signal transmission or reception. Beamforming increases the gain in a particular direction, and decreases gain in other directions. Beamforming may be used in sensor arrays, for examples, and can be utilized on electromagnetic arrays such as antennas and/or acoustic arrays. These systems include active or passive radar or sonar. Arrays of sensors include linear, planar and volumetric arrays. Beamforming is also used in communications to limit reception to a particular cell phone tower. Beamforming operates with the understanding that the beam pattern resulting from beamforming has a main lobe, side lobes, and nulls. The main lobe has the greatest gain and is at the look angle. The side lobes are angular regions having lesser gain. Nulls are angular regions having gain theoretically reduced to zero. Beamforming is also range dependent. When the range is unknown, it is known to beamform for groups of ranges known as range bins. Different look angles and ranges can be obtained by using different delays on the outputs of the sensor elements.

Adaptive beamforming adapts to the data received from the sensor array by placing nulls at the angles of arrival of the largest amount of clutter. To accomplish this, adaptive beamformers estimate the data covariance matrix. The data covariance matrix is typically estimated by the sample covariance matrix (SCM). The data covariance matrix is an Ne by Ne positive definite (and therefor nonsingular) matrix, where Ne is the number of elements in the array. For the SCM to be a nonsingular matrix, it must be produced using at least the same number of snapshots, Ns, as number of elements, Ne. A snapshot is a measurement of the signal levels of all the array element outputs at a particular time. The interval between snap shots, called the sampling frequency, is chosen in accordance with sampling theory. It is acknowledged in the art that a good estimate of the SCM requires a minimum of 2*Ne snapshots. Collecting many snapshots in a non-stationary environment is a problem, since the actual covariance changes over time.

Adaptive beamforming to remove interference can require capturing multiple snapshots of the signal to determine where to reduce the interference. This can be problematic in a non-stationary environment. Development of improved techniques of beamforming is desirable for these environments.

One prior art example includes a correlation filter for target suppression, a weight calculation method, a weight calculation device, an adaptive array antenna, and a radar device. A beam forming unit is configured to form a received synthetic beam by performing weight control based on the adaptive weight on the received signal to nullify a gain in a direction other than an arrival direction of the target signal.

Another example generally discusses an apparatus and method for forming a forward link transmission beam of a smart antenna in a mobile communication system. Angle of arrival (AoA) and beamwidth are estimated from the transmission covariance matrix. For a forward link channel to a mobile station can be estimated by synthesizing a covariance matrix considering a difference between transmission and reception frequency bands from the estimated AoA and beamwidth.

However, the above attempts do not disclose, teach, or suggest the presently disclosed method of reducing the snapshots for adaptive beamforming or providing a method that can be used in a non-stationary environment. Thus, there is a need for improved adaptive beamforming.

SUMMARY OF THE INVENTION

Accordingly, it is an object of the present invention to provide for improved adaptive beamforming that requires fewer snapshots of sensor data.

It is another object to provide a method of beamforming that can be used in a non-stationary environment.

Accordingly, there is provided a method for beamforming digitized signals from a sensor array to enhance signals originating from a preselected angle of interest and a preselected range bin while suppressing interference signals from other angles of arrival. Snapshots of sensor data are acquired and used to estimate an autocorrelation function. An autoregressive model of power is determined over angles of arrival as polynomial coefficients and roots are calculated as associated with the interference signals. Roots are selected for suppression by providing nulls. Exponentials are constructed from the roots. The exponentials are used with variances from the autoregressive model to provide a synthetic covariance matrix having weights that suppress the interference signals. Determining the synthetic covariance matrix may include determining a number of nulls needed to be placed at the AoA of the interference signals.

In other embodiments the method can include determining a number of nulls required based on the peak AoA of the interference signals. The method can operate with a single snapshot of sensor array data or fewer than twice the number of array elements. Other objects and advantages of the present invention will be apparent to those having ordinary skill in the art reading the instant specification, drawings, and appended claims.

BRIEF DESCRIPTION OF THE DRAWINGS

A further understanding of the nature and advantages of the present invention can be realized by reference to the following drawings. In the appended figures, similar components or features may have the same reference label.

DETAILED DESCRIPTION OF THE INVENTION

Methods, systems, and devices are disclosed for beamforming a multi-sensor signal. Beamforming is spatially filtering data from an array of sensor elements where the gain for a signal is increased in a particular direction, and decreased in other directions. Signals from sensors in a multi-sensor array such as an antenna array or sonar array destructively interfere if the signals are naively added together. A beamformer delays signals from sensors nearer the source in accordance with the range from the sensor to the source. This allows constructive addition of signals from sensors.

Figure 1:
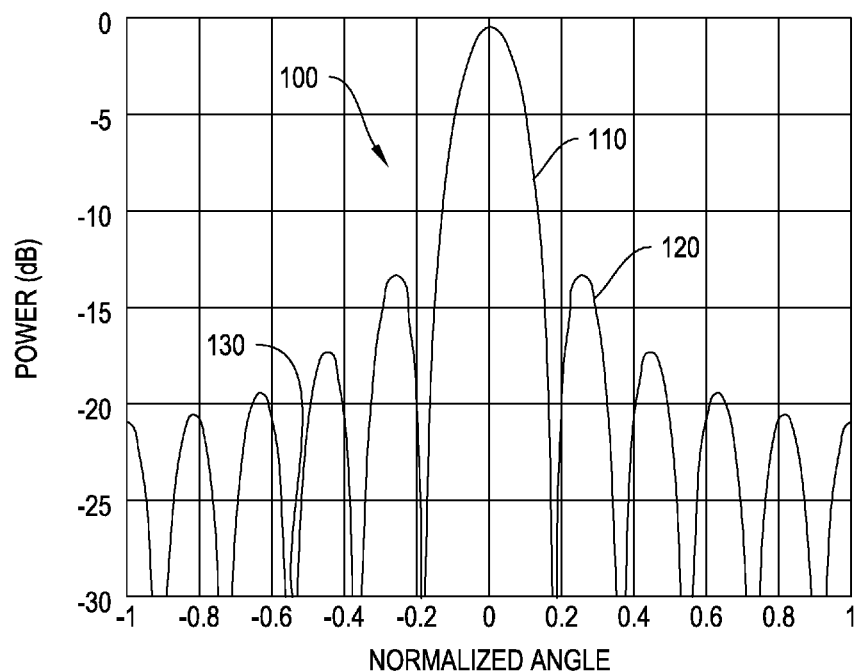
FIG. 1 is an exemplary plot of a beamformed pattern.

Referring to FIG. 1, shown therein is a plot of an exemplary beamformed signal 100 in accordance with aspects of the present disclosure. As illustrated in FIG. 1, a beamformed pattern gain can be plotted against angle of arrival and can include a main lobe, side lobes, and nulls. Typically, the largest gain is in the main lobe 110, side lobes 120 have less gain, and nulls 130 cancel the incoming signal. The direction of greatest gain is called the look angle. Different look angles can be obtained by using different delays on the outputs of the antenna elements or sensors.

On the receiving end, non-adaptive beamforming can be limited to a tradeoff between the main lobe width and side lobe suppression. As also illustrated in FIG. 1, some of the extraneous signals or clutter can have an angle of arrival (AoA) that is near a peak in the beam pattern. Because clutter is not at the main lobe, it can receive around 18 dB of suppression, for example. Also some of the clutter can have an AoA near a null 130 and, as a result, is suppressed to a much greater degree.

Adaptive beamforming adapts to the data by placing nulls at the AoAs of the largest amount of clutter. To accomplish this, adaptive beamformers estimate the data covariance matrix, which is typically estimated by the sample covariance matrix (SCM). The data covariance matrix is a Ne by Ne positive definite (and therefor nonsingular) matrix, where Ne is the total number of elements in the sensor array. For the SCM to be a nonsingular matrix (an important requirement) it must be produced using at least Ne snapshots (a snapshot is a measurement of all the array elements at a particular time). For a good estimate, the SCM requires a minimum of 2*Ne snapshots. In a large array (large Ne), many snapshots will be needed. However, collecting many snapshots in a non-stationary environment is a problem, since the true covariance changes over time.

In particular, reducing interference in a beamformed signal in the present disclosure can include performing adaptive beamforming without using the SCM. Since the present disclosure does not use SCM, the adaptive beamforming can be determined with less than 2*Ne snapshots. According to certain embodiments, the presently disclosed synthetic robust adaptive beamformer (S-RAB) can be performed with as few as one snapshot. When fewer snapshots are required, the S-RAB is robust to data non-stationaries, i.e., to objects that are mobile.

Generally, the S-RAB algorithm of the present disclosure can estimate the AoA(s) of the greatest clutter and synthesize a covariance matrix, that when used in adaptive beamforming, will place nulls in the AoAs of the greatest clutter.

This description provides examples, and is not intended to limit the scope, applicability or configuration of the invention. Rather, the ensuing description will provide those skilled in the art with an enabling description for implementing embodiments of the invention. Various changes can be made in the function and arrangement of elements.

Thus, various embodiments may omit, substitute, or add various procedures or components as appropriate. For instance, it should be appreciated that the methods can be performed in an order different than that described, and that various steps can be added, omitted or combined. Also, aspects and elements described with respect to certain embodiments can be combined in various other embodiments. It should also be appreciated that the following systems, methods, devices, and software may individually or collectively be components of a larger system, wherein other procedures may take precedence over or otherwise modify their application.

Figure 2:
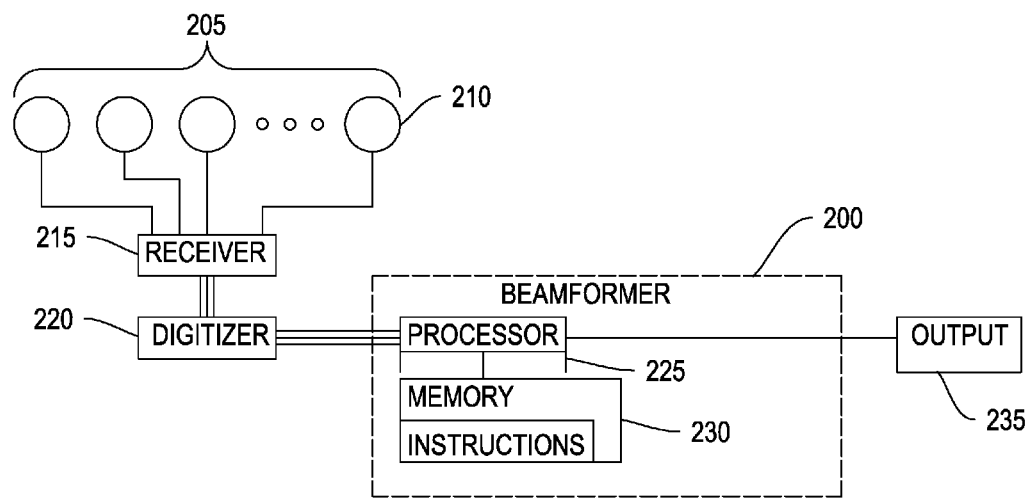
FIG. 2 is a block diagram of one embodiment of a beamformer.

Referring now to the drawings, and more particularly to FIG. 2, shown therein is a block diagram of a beamformer 200 used to process signals from an array 205 of sensors, as shown typically at 210. Sensors 210 can be antenna elements, acoustic sensors or any other sensors of interest. Array 205 is joined to an receiver 215. Characteristics of the receiver 215 depend on the type of sensors 210 being utilized. Receiver 215 can perform analog signal conversion and conditioning. Output from receiver 215 is digitized by digitizer 220 to give separable streams of digital data with one separable stream being provided for each sensor 210. This data stream can be separate data lines or can be a multiplexed data line. Digitizer 220 is joined to beamformer 200 for processing the sensor data. Beamformer 200 can be implemented in a general purpose computer having the capability of handling Ne streams of data from array 205. Beamformer 200 includes a processor module 225 and a memory 230. Each of these components may be in communication, directly or indirectly. Beamformed data is provided to an output 235. This output 235 can be a display means or another processing system for processing the received signals.

The processor module 225 may be configured to execute computer-readable program code stored in the memory 230 to implement one or more aspects of beamformer 200. Processor 225 executes instructions to determine a bearing to or an angle of arrival (AoA) of one or more signals. These signals can be a signal of interest identified by a user or other system and various interference signals. Processor 225 executes instructions to determine the AoAs of the interference signals. Based on the determined AoAs, processor 225 computes a synthetic covariance matrix. Processor 225 can utilize the computed synthetic covariance matrix to perform adaptive beamforming to cancel at least a portion of the one or more interference signals.

Figure 3:
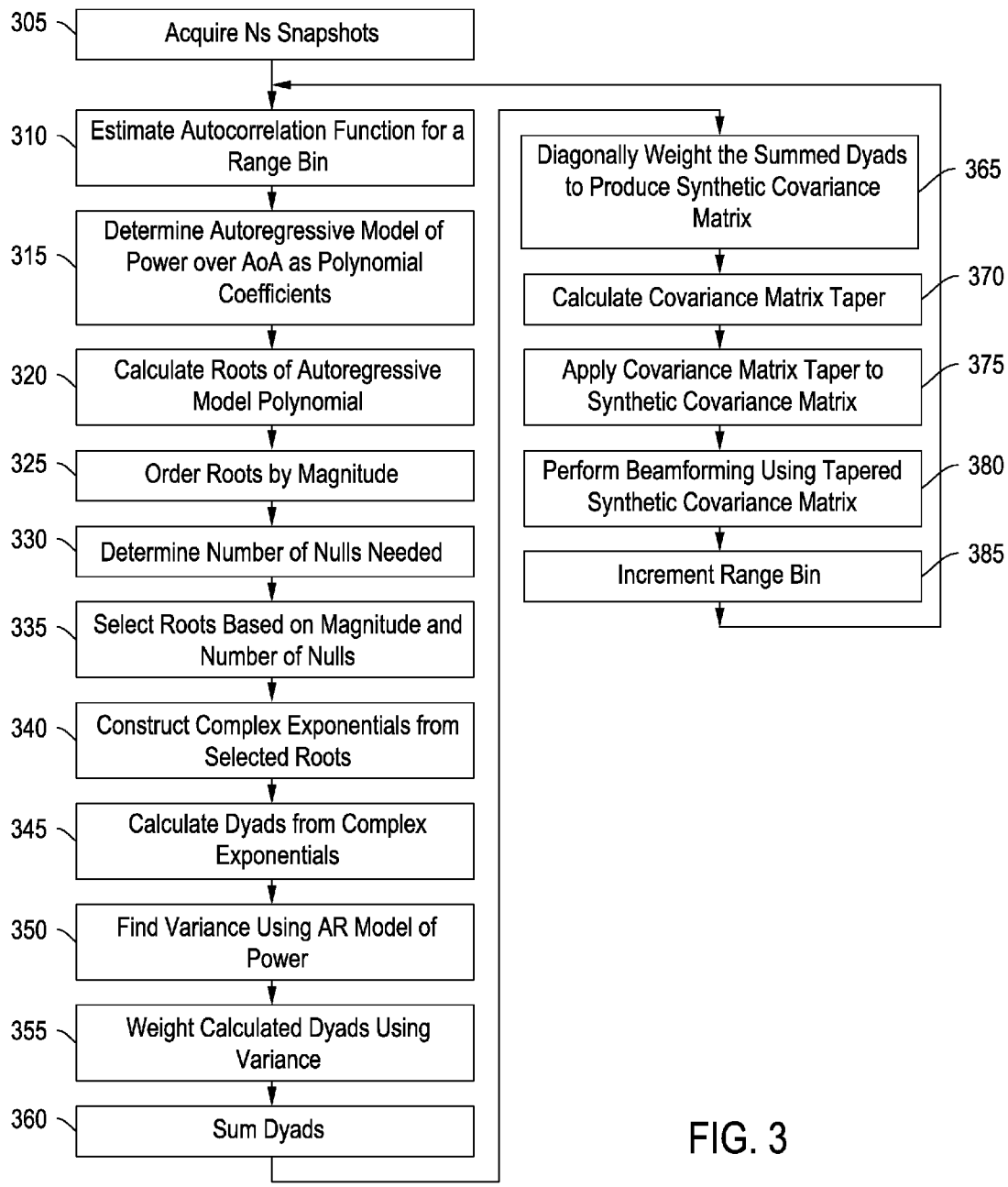
FIG. 3 is a flowchart diagram of an example method of reducing interference in a beamformed signal according to various embodiments of the invention.

FIG. 3 provides a flowchart of the basic method. In step 305, the processor obtains at least one snapshot of the signal levels of all of the sensors 210 in the array 205. The number of snapshots is given by Ns. In some instances, only one snapshot is available for use. An element autocorrelation function (ACF) is estimated in step 310 utilizing the Ns snapshots, as follows:

$$\hat{R}[k, s] = \begin{cases} \dfrac{1}{Ne} \sum_{n=0}^{Ne-1-k} x^*[n, s] x[n+k, s] & \text{for } k = 0, 1, \ldots Ne - 1 \\ \hat{R}^*[-k, s] & \text{for } k = -(Ne-1), (Ne-2), \ldots -1 \end{cases} \quad (1)$$

for s=1 . . . Ns $$\hat{r}[k] = \frac{1}{N_s}\sum_{s=1}^{N_s} \hat{R}[k,s] \quad \text{for } k = 0, \pm 1, \pm 2 \ldots \pm N_e \qquad (2)$$

where $\hat{R}[k,s]$ is the ACF with index n being the element, index k being the element delay, and index s being the snapshot index. x[n,s] is the measurement from the element at the time, and x*[n,s] is the complex conjugate of the measurement. $\hat{r}[k]$ is the kth lag of the ACF.

Processor 225 then determines an autoregressive model of the distribution of power over the AoAs in step 315. This autoregressive model is the coefficients of a polynomial, as given below:

$$\begin{bmatrix} a[0] \\ a[1] \\ a[2] \\ \vdots \\ a[N_z-1] \end{bmatrix} = \begin{bmatrix} \hat{r}[0] & \hat{r}[-1] & \hat{r}[-(N_z-1)] \\ \hat{r}[1] & \hat{r}[-1] & \cdots & \hat{r}[-(N_z-2)] \\ \vdots & & \ddots & \vdots \\ \hat{r}[N_z-1] & \cdots & & \hat{r}[0] \end{bmatrix}^{-1} \begin{bmatrix} \sigma^2 \\ 0 \\ 0 \\ \vdots \\ 0 \end{bmatrix}. \qquad (3)$$

a[z] is a polynomial, where the power of the process in the frequency domain is $1/FFT(|a[z]|^2)$, and FFT is the fast Fourier transform. $\sigma^2$ is the power of the process. This could be known or estimated from the data.

In step 320, processor 225 computes the roots of the autoregressive model polynomial. Each root is associated with an interference signal. Processor 225 orders the roots by magnitude in step 325 so that the root associated with the highest level interference signal is given priority over lower level interference signals.

$$a[0] + a[1]z^{-1} + a[2]z^{-2} + \ldots + a[N_z-1]z^{-(N_z-1)} = \qquad (4)$$
$$(1-p[1]z^{-1})(1-p[2]z^{-1}) \ldots (1-p[N_z]z^{-1})$$

Without loss of generality, it can be assumed that:

$$|p[1]|>|p[2]|>|p[3]|> \ldots |p[N_z]|. \qquad (5)$$

In step 330, processor 225 then determines the number of nulls that are necessary to reduce the interference signal. This is typically one less than the number of elements or sensors 210 in array 205, but this could also be determined from the magnitude of the roots. Step 335 selects the roots. If the magnitude of some roots is below a predetermined threshold, the processor can omit nulls associated with these roots. Processor can also omit nulls having an angular displacement near the look angle in order to avoid suppressing the signal of interest.

$$\theta_n = \tan^{-1}\frac{\text{imag}(p[n])}{\text{real}(p[n])} \text{ for } n = 1 \ldots N_z \qquad (6)$$

This allows the estimation of $N_z$ zeros. Zeros close to the main beam can be ignored in order to avoid attenuating data of interest. In some applications having known interference signals, the number of nulls could be preset in processor 225 instructions. This could also be performed by a model order estimation algorithm as is known in the art.

The processor then constructs complex exponentials for the determined number of nulls in step 340. Dyads are calculated from the constructed complex exponentials in step 345. In step 350, processor 225 then calculates a variance from the autoregressive polynomials. The calculated variance is used give weights to the calculated dyads in step 355. In step 360, the dyads are then summed.

$$C_s = \sum_{n=1}^{N_z} d_n d_n^* + I_{N_e} \qquad (7)$$

where $d_n = v \cdot s$, $s = [1 + e^{-i2\pi d * \sin \theta_n} + e^{-i4\pi d * \sin \theta_n} + \ldots + e^{-i2*N_e\pi d*\sin \theta_n}]$, v is the variance of the process, and d is the element spacing.

An identity matrix, $I_{N_e}$, can be added to the summed dyad matrix, $C_S$, to provide diagonal loading in step 365. This produces synthetic covariance matrix, $C_{SyCM}$. In step 370, a covariance matrix taper can be calculated in accordance with Guerci, J. R., "Theory and Application of Covariance Matrix Tapers for Robust Adaptive Beamforming," 47 IEEE Transactions on Signal Processing, Issue 4, Pages 977-85 (April 1999) which is incorporated by reference herein. Application of the covariance matrix taper in step 375 broadens the nulls to allow for signal variations.

$$C_{SyCM} = C_S \circ [\sin c(\Delta|i-j|)/\pi] \qquad (8)$$

where $i=1 \ldots N$, $j=1 \ldots M$, N is the number of rows in $C_S$, and M is the number of columns in $C_S$, and $\Delta$ is chosen to be between 0.01 and 0.1 depending how wide the nulls should be. Larger $\Delta$ produces wider nulls. Adaptive beamforming weights are calculated multiplying the SyCM by using the equation below, $$\text{weights} = C_{SyCM}^{-1} s. \qquad (9)$$

Processor 225 then performs standard adaptive beamforming utilizing the tapered synthetic covariance matrix in step 380. The range bin can be incremented in step 385 and the method iterated.

Some exemplary advantages of the present disclosure are fewer Ns snapshots are needed than standard adaptive beamforming. Also, aspects of the present disclosure are robust to non-stationaries in the data. Further, more control of where the nulls are placed is also provided.

According to additional aspects of the present disclosure, adaptive beamformers (ABF) can place nulls at the direction of arrivals (DOAs) of the greatest interferers. The optimal method to perform adaptive beamforming may include inverting the covariance matrix of the data. The covariance matrix R is an N by N matrix, where N is the number of elements in the array. In some situations, R can be unknown and it can be estimated from the data. The maximum likelihood estimator for R is the sample covariance matrix (SCM). For the SCM to be a good estimate of R, it should be estimated using at least 2N snapshots, where a snapshot is a measurement of all the array elements at a particular time. If the data is stationary (R not changing with time) then, collecting 2N snapshots is possible. Unfortunately, in some situations the data is not stationary, and collecting data over time is difficult or even impossible. A common method of overcoming the limit on data is to use one of the many reduced rank ABF algorithms.

The algorithm described in the present disclosure for the synthetic robust adaptive beamformer (S-RAB) can be considered a new type of reduced rank algorithm. It can be assumed that in certain situations there is a high interference to noise ratio (INR). This assumption is reasonable because in the low INR case there may not be a need for an ABF. The high INR enables the use of power spectral density (PSD)

methods to estimate the interference DOA. Once the DOA of the interference is known, a synthetic covariance matrix (SyCM) can be constructed. The SyCM can be constructed so it will cancel the interference when used in place of the SCM. The S-RAB algorithm has two advantages, for example. First, the algorithm can operate with very few snapshots, making it robust to non-stationary data. Second, because the SyCM is synthesized it is easy to control the properties of the beam pattern.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a SIM card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for beamforming digitized individual signals from a sensor array to enhance signals originating from a preselected angle of interest and a preselected range bin while suppressing interference signals from other angles of arrival comprising:
   acquiring Ns snapshots of sensor array data;
   estimating an autocorrelation function for the range bin utilizing at least one of said Ns snapshpots;
   determining an autoregressive model of power over angles of arrival from the autocorrelation function as polynomial coefficients;
   calculating roots of the autoregressive model associated with the interference signals;
   ordering calculated roots of the autoregressive model by magnitude;
   determining the number of nulls needed to suppress interference signals;
   selecting roots based on the ordered calculated roots and the number of nulls determined;
   constructing complex exponentials from the selected roots;
   calculating dyads from the constructed complex exponentials;
   finding a variance utilizing the determined autoregressive model of power;
   weighting calculated dyads utilizing the variance;
   summing the dyads;
   diagonally weighting the summed dyads to produce a synthetic covariance matrix; and
   utilizing the synthetic covariance matrix to beamform the digitized signals by applying weights and delays to the individual signals.

2. The method of claim 1 further comprising the steps of:
   calculating a covariance matrix taper prior to the step of utilizing the synthetic covariance matrix; and
   applying the calculated covariance matrix taper to the synthetic covariance matrix prior to the step of utilizing the synthetic covariance matrix.

3. The method of claim 1 wherein one snapshot of sensor array data is acquired.

4. The method of claim 1 wherein the sensor array has Ne elements and the number of snapshots Ns of sensor array data is less than twice the number of elements Ne.

5. The method of claim 1 wherein the step of determining the number of nulls comprises utilizing a preselected number of nulls.

6. The method of claim 1 wherein the step of determining the number of nulls comprises providing nulls only for roots exceeding a predetermined threshold.

7. A method for beamforming signals comprising:
   acquiring signals from elements of a multisensor array, said signals including signals of interest originating from a preselected angle of interest and a preselected range bin and interference signals originating from other angles of arrival;
   digitizing acquired signals for provision as sensor array data;
   capturing Ns snapshots from said sensor array data;
   identifying range bins and carrying out the following steps for each range bin;
   estimating an autocorrelation function for the range bin utilizing at least one of said Ns snapshots;

determining an autoregressive model of power over angles of arrival from the autocorrelation function as polynomial coefficients;

calculating roots of the autoregressive model associated with the interference;

ordering calculated roots of the autoregressive model by magnitude;

determining the number of nulls needed to suppress signals from angles of arrival other than the angle of interest;

selecting roots based on the ordered calculated roots and the number of nulls determined;

constructing complex exponentials from the selected roots;

calculating dyads from the constructed complex exponentials;

finding the variance utilizing the determined autoregressive model of power;

weighting calculated dyads utilizing the variance;

summing the dyads;

diagonally weighting the summed dyads to produce a synthetic covariance matrix; and utilizing the synthetic covariance matrix to beamform the digitized signals in the range bin by applying weights and delays to the signal from each element of the multisensory array.

8. The method of claim 7 wherein said multisensor array is a multi-element antenna array.

9. The method of claim 7 wherein said multisensor array is a multi-sensor sonar array.

10. The method of claim 7 further comprising the steps of:

calculating a covariance matrix taper prior to the step of utilizing the synthetic covariance matrix; and applying the calculated covariance matrix taper to the synthetic covariance matrix prior to the step of utilizing the synthetic covariance matrix.

11. The method of claim 7 wherein one snapshot of sensor array data is acquired.

12. The method of claim 1 wherein the sensor array has Ne elements and the number of snapshots Ns of sensor array data is less than twice the number of elements Ne.

13. The method of claim 7 wherein the step of determining the number of nulls comprises utilizing a preselected number of nulls.

14. The method of claim 7 wherein the step of determining the number of nulls comprises providing nulls only for roots exceeding a predetermined threshold.

\* \* \* \* \*